(12) United States Patent
Quan

(10) Patent No.: US 6,424,716 B1
(45) Date of Patent: Jul. 23, 2002

(54) METHOD AND APPARATUS FOR IMPROVED HORIZONTAL AND VERTICAL OVERLAY SIGNALS FOR GREATER CONCEALMENT IN MODERN TV SETS

(75) Inventor: Ronald Quan, Cupertino, CA (US)

(73) Assignee: Macrovision Corp., Santa Clara, CA (US)

( * ) Notice: Subject to any disclaimer, the term of this patent is extended or adjusted under 35 U.S.C. 154(b) by 0 days.

(21) Appl. No.: 09/212,336

(22) Filed: Dec. 15, 1998

(51) Int. Cl.[7] .............................................. H04N 7/167
(52) U.S. Cl. ...................... 380/221; 380/224
(58) Field of Search ............... 380/221, 224

(56) References Cited

U.S. PATENT DOCUMENTS

| | | | | |
|---|---|---|---|---|
| 2,619,530 A | * | 11/1952 | Roschke | |
| 4,458,268 A | * | 7/1984 | Ciciora | 380/15 |
| 4,466,017 A | * | 8/1984 | Banker | 380/15 |
| 4,471,380 A | * | 9/1984 | Mobley | 380/15 |
| 4,605,961 A | * | 8/1986 | Frederiksen | 380/14 |
| 4,700,386 A | * | 10/1987 | Kohn | 380/10 |
| 4,703,354 A | * | 10/1987 | Auld, Jr. et al. | 348/531 |
| 4,716,588 A | * | 12/1987 | Thompson et al. | 380/20 |
| 4,742,543 A | * | 5/1988 | Frederiksen | 380/9 |
| 5,058,157 A | * | 10/1991 | Ryan | 380/11 |
| 5,091,935 A | * | 2/1992 | Meriwether et al. | 380/15 |
| 5,177,787 A | * | 1/1993 | Murphy et al. | 348/684 |
| 5,206,907 A | * | 4/1993 | Hashimoto | 380/14 |
| 5,581,307 A | * | 12/1996 | Ryan et al. | 348/630 |
| 5,617,475 A | * | 4/1997 | Marz | 380/14 |
| 5,768,377 A | * | 6/1998 | Chang | 380/222 |
| 5,844,988 A | * | 12/1998 | Ryan et al. | 380/11 |
| 5,920,626 A | * | 7/1999 | Durden et al. | 380/10 |
| 6,009,172 A | * | 12/1999 | Kurowski et al. | 380/11 |

* cited by examiner

*Primary Examiner*—Gilberto Barron
*Assistant Examiner*—Douglas J. Meislahn
(74) *Attorney, Agent, or Firm*—George Almeida

(57) ABSTRACT

Video signals are scrambled by position modulating or switching between two types of modified horizontal sync pulses. These modified horizontal pulses are modulated or switched at a rate that causes a non-interlaced tearing pattern when viewed by an unauthorized viewer, whereby greater concealment is achieved by the invention when compared to the prior art. The modified scrambling process also is adapted to achieve lower tuner AGC artifacts. With added fake vertical sync signals and strategic use of double or multiple horizontal sync pulses per TV line, modern TV sets using count down circuits are also affected vertically to enhance the concealment effects.

37 Claims, 5 Drawing Sheets

METHOD AND APPARATUS FOR IMPROVED HORIZONTAL AND VERTICAL OVERLAY SIGNALS FOR GREATER CONCEALMENT IN MODERN TV SETS

BACKGROUND OF THE INVENTION

The present invention relates to processes for scrambling television signals transmitted over the air or via a cable environment, and in particular to a scrambling technique which generates non-interlaced horizontal sync modulation as well as a double horizontal pulse in selected horizontal blanking intervals, to enhance horizontal tearing and vertical instabilities in a program video picture. The invention is particularly effective over prior art scrambling systems which use typical horizontal and vertical overlay signals, when applied to modern television set scanning systems using count down circuits with ceramic resonator voltage controlled oscillators. The invention's effectiveness is not limited to television sets and monitors using cathode ray tube displays. It is effective in other display systems such as LCD, plasma display and other solid state display systems.

In typical prior art scrambling systems, the horizontal and/or vertical sync modification techniques are ineffective on more modern television sets. With their scanning systems containing digital circuits, such modern sets can lock to a modified television signal with or without vertical sync pulses. As a result, a scrambled television signal containing prior art time position varying vertical sync signals has no effect on such modern television sets, even though such prior art signals will induce good concealment for scrambling purposes on older sets using conventional horizontal oscillators.

The prior art horizontal overlay sync modifications of previous mention use an interleaved pattern. This interleaved (interlaced) pattern in a field-to-field basis was thought to achieve maximum concealment, however such an interleaved (interlaced) pattern is found to impart less concealment because the tearing is distributed over two fields. As a result, the tearing appears to be diluted.

In contrast, in the present invention, more scrambling concealment is achieved since the horizontal sync is position modulated at a non-interleaved frequency that is a multiple of the field frequency. This consistently causes a tearing pattern which is generally the same in every field and that is less revealing of picture content.

It should be noted that in some horizontal sync width modulation schemes (i.e. the horizontal sync is pulse width modulated roughly 3:1 for 2.4 microseconds ($\mu$s) to 7 $\mu$s), decoding artifacts arise because the television or cable tuner detects the varying horizontal sync pulse width for its automatic RF and/or IF gain control (AGC). As a result, a narrowed horizontal sync width delivers a different AGC voltage than a wider horizontal sync width. The video gain of the tuner is then modulated according to the horizontal sync width and thus, causes undesirable AGC artifacts.

OBJECTS OF THE INVENTION

Exemplary objects and advantages of the invention are:
a) To generate unique preferably non-interlaced horizontal sync modulation for a scrambling process, that can be descrambled, which causes more effective horizontal concealment to an unauthorized viewer:
b) To generate unique multiple horizontal sync modulation which is combinable with position varying vertical sync pulses in a scrambling process, that can be descrambled, which causes more horizontal and vertical concealment when viewed by an unauthorized viewer. This increased concealment occurs especially when viewed on a more modern television set such as those sets using ceramic resonators and digital count down circuits in their scanning system; and
c) To provide a new scrambling method as described in "a" or "b" above with reduced or no AGC artifacts in a television or cable tuner.

SUMMARY OF THE INVENTION

The present invention overcomes the shortcomings and problems of the aforementioned prior art while providing a method and apparatus which achieves the objects and advantages of previous mention.

To this end, a first embodiment of the present invention comprises a method and apparatus for modifying, i.e. scrambling, the horizontal sync and burst within a standard horizontal blanking interval of, for example, about 11 microseconds ($\mu$s). If a subsequent descrambler system replaces such a scrambled sync and burst beyond the standard horizontal blanking interval (i.e. greater than 11 $\mu$s; for example, 14 $\mu$s), the modified or scrambled sync and burst occur over an extended horizontal interval and thus yield greater horizontal concealment.

In accordance with a first embodiment of the invention, horizontal sync and/or burst envelope signals preferably are narrowed by about half within the horizontal blanking interval. In one situation, the narrowed sync and/or burst are located at a position just after the end of an active program video line. This may allow for a breezeway of approximately 400 nanoseconds (ns) if desired, which is not required in the present invention (200 ns to 500 ns will also work for the breezeway period). In another location, the narrowed sync and/or burst are positioned closest to the beginning of the following program video line. The net positional displacement of these two narrowed sync and burst locations is a "gap" of about 6 $\mu$s (even more displacement exists in the situation where the horizontal blanking interval, and thus the gap, is enlarged).

The scrambling method of the invention includes position modulating or switching between the two locations (inclusive) at a rate of N * Field Frequency where N is a positive whole number. For example, in NTSC, the field frequency is 59.94 Hertz (Hz). It has been found with many television sets, the maximum concealment (is at N=11) and the rate of modulation is a non-interleaved frequency of about 660 Hz. In this embodiment, it has been found that field-to-field horizontal overlay patterns with an interleaved frequency such as 690 Hz do not provide as much concealment as the pattern with a non-interleaved frequency of 660 Hz. The invention is equally useful in other scanning standards including PAL, SECAM and higher line and field rates used in higher definition television systems.

For slight rolling effects (up or down the screen) that can cause even more concealment, a modified rate of sync modulation for the 660 Hz example is from 654 Hz to 666 Hz. Thus, the following range of frequencies based on N=8, N=9, N=10, N=13, will also provide concealment: 474 Hz to 486 Hz, 534 Hz to 546 Hz, 594 Hz to 606 Hz, 714 Hz to 726 Hz, 774 Hz to 786 Hz, respectively, and the like. These different rate frequencies may be used in any combination in position modulating the modified horizontal sync pulse throughout the field. For example, the top and bottom third of the television field may have the modified horizontal sync pulse modulated at 714 Hz while the middle portion of the field may have the modified horizontal sync pulse modulated at 665 Hz.

Accordingly, to provide optimum horizontal concealment with a slight rolling effect vertically, the rate of sync modulation is for example made equal to N * Field Frequency plus or minus K * 10% of field frequency, where K generally is between 0 and 1 inclusive. For example, K can be larger than 1.

The preferably narrowed horizontal sync widths are about the same for each television line, regardless of location or position, therefore tuner AGC artifacts are reduced or eliminated.

In a second (alternative) embodiment, fake vertical sync (V sync) pulses are inserted before and/or after the normal vertical sync pulse's location (for example, in NTSC, lines 1–3 and lines 18–20) and the normal vertical sync pulses (broad sync pulses) are taken out. These fake pre-vertical and post-vertical sync pulses are for example, alternately switched from one location (pre-V sync) to another (post-V sync) at a selected frequency, such as for example, field rate or at selected random rates. Normally these fake vertical pulses will cause jumping up and down (vertical jumping) of the picture in many television sets, but not in the more modern sets which use ceramic resonator oscillators and digital count down circuits in the scanning system. However, simultaneous application of the horizontal sync modifications as described in the first embodiment above does cause sufficient horizontal and/or vertical tearing and/or vertical jumping of the picture on the more modern sets.

For even more concealment when applying vertical jumping as well, small portions of the top and bottom of the active field, including the vertical blanking interval if possible, include an added horizontal sync pulse to provide a further technique of double horizontal sync modification ("double sync"). This double sync modification switches in a second horizontal sync pulse per line to cause for example the count down circuits in the modern television sets to miscount or misbehave, thus causing vertical rolling and attendant picture concealment. The small portions of the top and/or bottom and/or the vertical blanking interval, where the double sync pulses are generally switched in (either all or part of the time), does not cause as much horizontal tearing as does the first embodiment. However, this is not necessarily bad for this double sync modification scrambling process. For example, since most of the program material of interest generally is in the middle 70 to 85% of the active television field, reduced concealment in the other 15 to 30% of the television field is a small penalty as long as the middle of the field is sufficiently scrambled. It follows that a preferred modification for the second embodiment of the invention, for example in the middle 80% of the active field, also includes the horizontal sync modification as described in the first embodiment above. It should be noted that the double horizontal sync pulses of the second embodiment can be applied anywhere in the television field as well, and when combined with fake vertical pulses will cause the picture in modern sets to vertically jump and also tear horizontally.

In the second embodiment, where AGC artifacts are concerned, it is preferable to have the same effective horizontal pulse width per line when applying the double sync modification of previous mention. To achieve this, in the double sync modification, the summation of the double sync pulse widths in the small portion of lines at the top and/or bottom, and/or the vertical blanking interval locations, is substantially equal to the single horizontal sync pulse width of the other lines. When a double sync is switched in, each of the individual sync pulses therefore is narrower in width than the width of the single pre- or post-horizontal sync pulse. For example, a 4 μs sync pulse is used in the areas having the small portion of lines. When double sync pulses are switched in, two 2 μs horizontal sync pulses may be used per television line. However it is readily apparent that the width of each double sync pulse does not have to be exactly one half of the normal pulse. These conditions are illustrated below in the discussion of FIGS. 1E through 1G.

BRIEF DESCRIPTION OF THE DRAWINGS

The foregoing and other features of the present invention will be more readily apparent from the following detailed description of the preferred embodiments taken in conjunction with the attached drawings wherein.

DESCRIPTION OF THE PREFERRED EMBODIMENTS

As described previously, FIGS. 1B to 1G and 2A to 2C illustrate by way of example various horizontal sync modifications in the horizontal blanking interval in accordance with the present invention for causing a television set to tear the program video picture. These figures, along with FIGS. 3A to 3D, are described above and further referred to in the description following.

Figure 4:
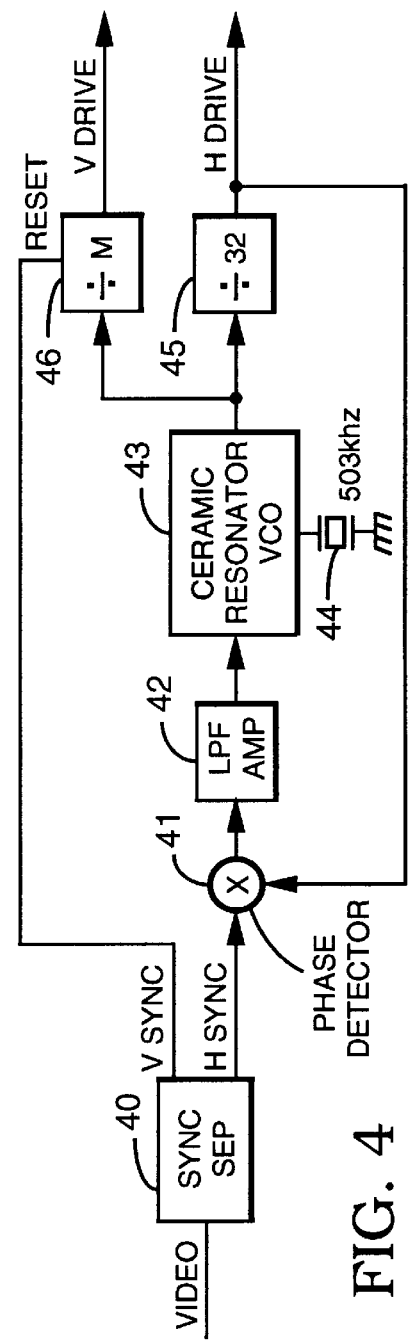
FIG. 4 illustrates a scanning system for modem television sets including a ceramic resonator oscillator used in conjunction with count down circuits to derive vertical drive (V drive) and horizontal drive (H drive) signals from a video signal.

First however, FIG. 4 is a block diagram of a scanning circuit of a modern television (TV) set wherein a video signal received by the TV set is supplied to a sync separator 40. In this example, the video signal contains the sync modifications of the invention illustrated in FIGS. 1B to 1D, and/or the alternatives of FIGS. 1E to 1G and 2A to 2C. The output of sync separator 40 thus provides either the pre- or post-horizontal sync pulses (or position modulated sync pulses), as well as the double sync pulses, of the invention on an H sync output. The H sync output is supplied to a phase detector 41. With the pre- and post-horizontal sync pulses as an input, a low pass filter amplifier 42 supplies an error voltage to a ceramic resonator voltage controlled oscillator (VCO) 43, which error voltage is indicative of the phase of the pre- and post-horizontal sync pulses. A ceramic resonator 44 supplies a frequency to the VCO 43 which is 32 times the nominal horizontal frequency. The output of VCO 43 is then a phase modulated signal and is digitally divided down by 32 via a count down circuit 45 to provide an output of a phase modulated horizontal frequency signal H drive. Thus the H drive signal supplied from circuit 45 is a scanning signal that is phase modulated and displaces the program video from side to side.

In the operation of FIG. 4, the phase detector 41 also simultaneously receives from time to time both pre- and post-horizontal sync signals from the count down circuit 45. This causes phase detector 41 to output erroneous signals such that the ceramic resonator VCO 43 from time to time supplies a correspondingly erroneous frequency signal. This erroneous frequency signal causes the count down circuit 45, and a count down circuit 46, to miscount. This in turn causes circuit 46 for example to generate a phase modulated vertical drive signal V drive during the presence of the fake vertical sync signals of previous mention. As a result, the V drive signal supplied by the circuit 46 from time to time will cause the scanning system to be unstable vertically, thereby achieving the concealment desired by the invention.

Figure 1A:
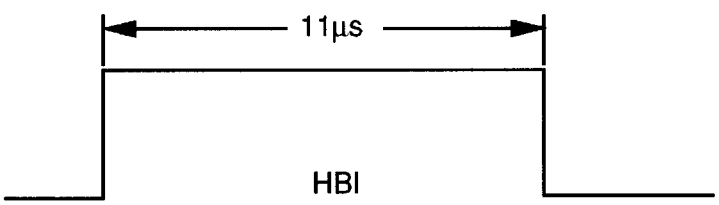
FIG. 1A shows a horizontal blanking interval duration in a typical television line.
Figure 1B:
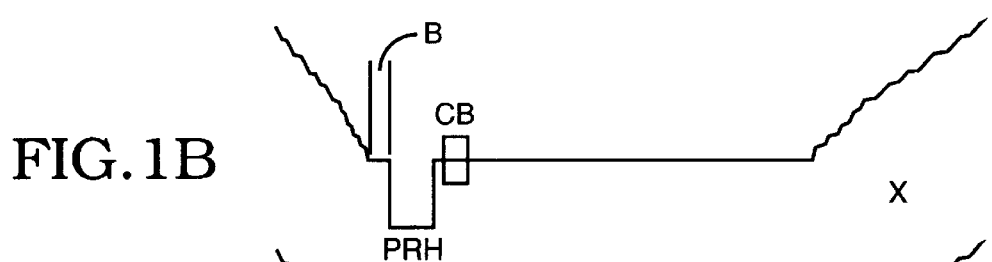
FIG. 1B illustrates a horizontal sync modification of the present invention for a pre-horizontal sync pulse (PRH) as part of a scrambling signal, and including if desired interval B as a breezeway that is typically between 200 nano seconds (ns) and 500 ns.
Figure 1C:
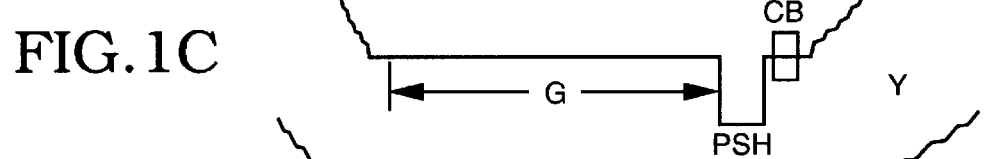
FIG. 1C illustrates a horizontal sync modification of the present invention for a post-horizontal sync pulse (PSH) as part of a scrambling signal, and including an interval or gap G as the tearing displacement generated via the gap (measured in time units such as 25 microseconds) between PRH and PSH.
Figure 1D:
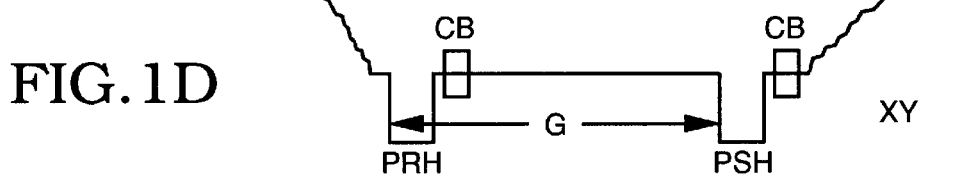
FIG. 1D illustrates a double horizontal sync modification of the present invention that is used to cause vertical jumping in modern television sets, particularly when combined with fake vertical sync modifications.
Figure 1E:
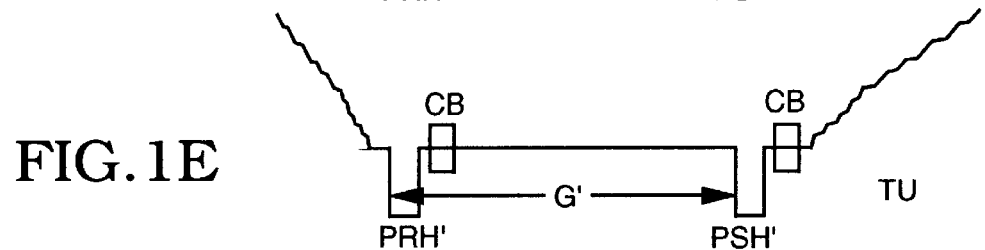
FIG. 1E illustrates a double horizontal sync modification of the present invention wherein sync widths PRH' and PSH' have been reduced to avoid tuner AGC artifacts.
Figure 1F:
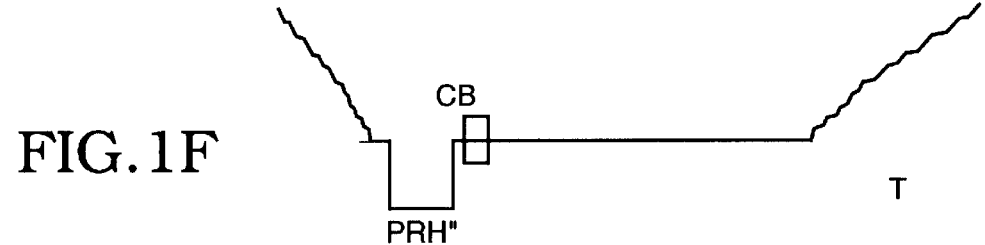
FIG. 1F illustrates a pre-horizontal sync modification (PRH") of the present invention whose pulse width is about the summation of the widths of PRH" and PSH" in FIG. 1E, illustrating PRH" as used with the modification of FIG. 1E in a video field to avoid tuner AGC artifacts.
Figure 1G:
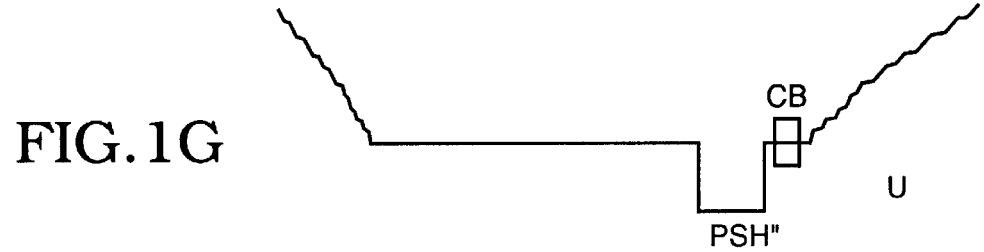
FIG. 1G illustrates a post-horizontal sync modification (PSH") of the present invention which is position modulated with PRH" of FIG. 1F as depicted in FIGS. 1B, 1C, and used with the modification of FIG. 1E to avoid causing tuner AGC artifacts.
Figure 2A:
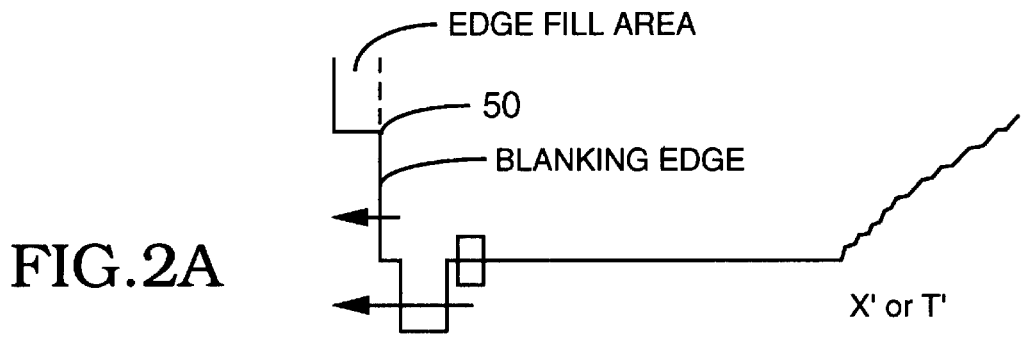
FIG. 2A illustrates a pre-horizontal sync modification of the present invention that tracks the edge fill area in a television scrambling process as described in U.S. Pat. No. 5,438,620 (referenced below) and illustrates the condition wherein a horizontal blanking interval is enlarged whereby greater tearing and concealment are achieved.
Figure 2B:
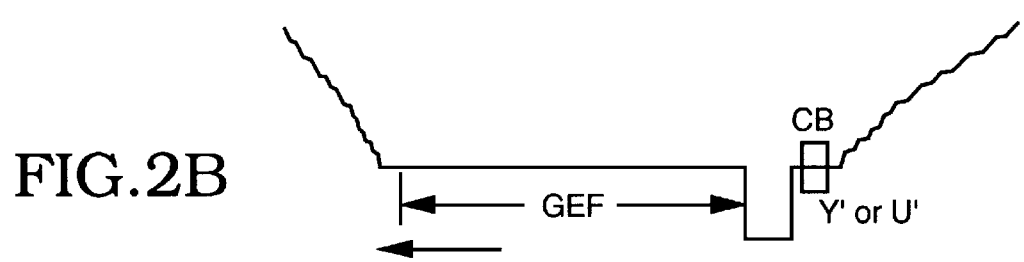
FIG. 2B illustrates a modification of the present invention having an increased gap, GEF, caused by taking advantage of moving the pre-horizontal sync pulse into the edge fill area outside the normal or reduced horizontal blanking interval.
Figure 2C:
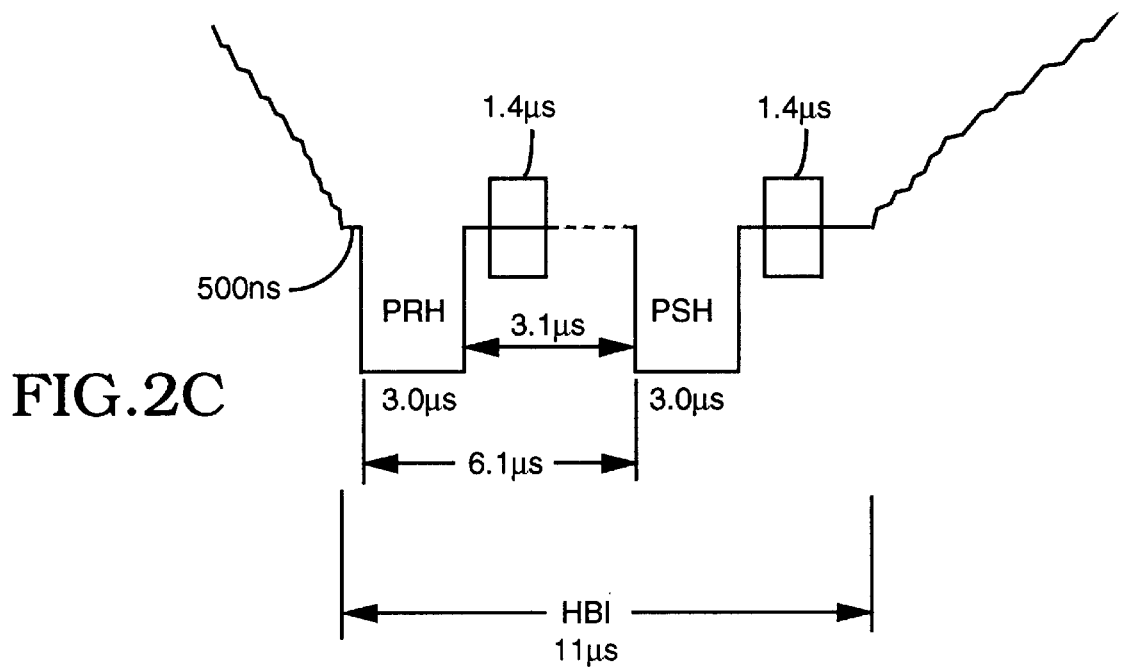
FIG. 2C illustrates an example of the first embodiment of the invention where the gap width and thus the tearing is over 6.1 microseconds, and illustrating that PRH and PSH are turned on and off alternately in blocks of lines at an on-and-off non-interleaved frequency rate of for example 660 Hz.
Figure 3A:
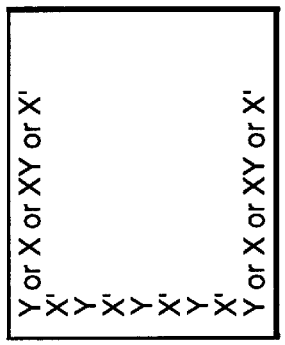
FIG. 3A illustrates possible locations, in a program video picture, of the modified horizontal sync pulses of the first embodiment (see FIGS. 1B and 1C for explanation of X, Y)
Figure 3C:
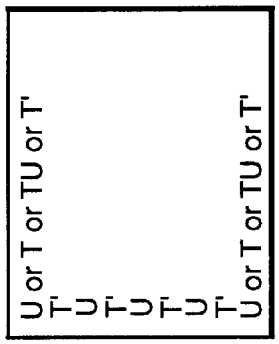
FIG. 3C illustrates possible locations of the modified horizontal sync pulses for increasing tearing by using the edge fill area, and also illustrates features of the second embodiment for enhancing vertical jumping (see FIGS. 1B, 1C, 1D and 2A for explanation of X Y, XY and X')
Figure 3B:
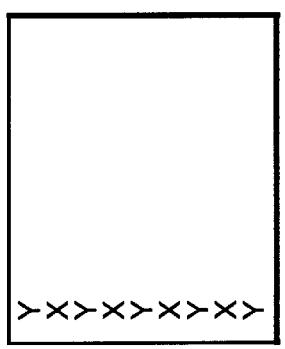
FIG. 3B illustrates possible locations of the modified horizontal sync pulses of the second embodiment, which cause vertical jumping particularly when used with added fake vertical sync pulses (see FIGS. 1B, 1C and 1D for explanation of XY, and XY)
Figure 3D:
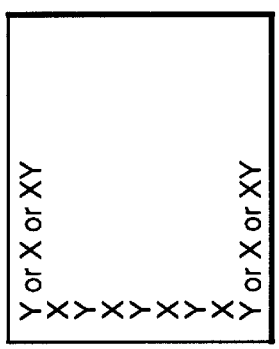
FIG. 3D illustrates possible locations of the modified horizontal sync pulses that cause horizontal tearing or vertical jumping particularly when used with added fake vertical sync pulses, and illustrates how to avoid tuner AGC artifacts by using a pulse width or widths that have about the same energy, in television lines, (see FIGS. 1E, 1F, 1G and 2A for explanation of U, T, TU and T'.
Figure 5:
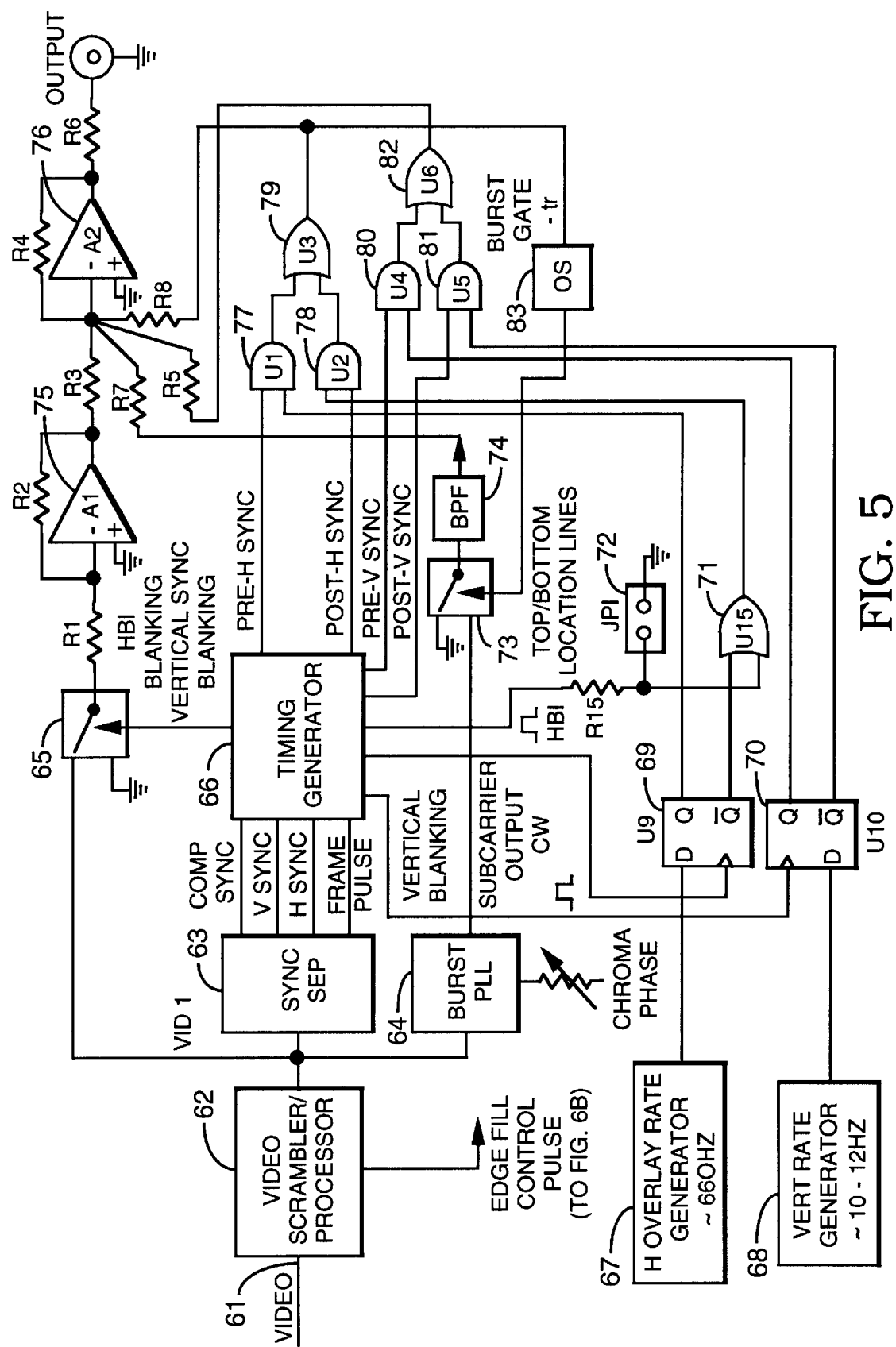
FIG. 5 is a block diagram illustrating the previously mentioned first embodiments, and includes a version of the second embodiments of the present invention.

The block diagram of FIG. 5 illustrates by way of example only, an apparatus of the present invention. Essentially, the circuit of FIG. 5 generates the wave forms depicted in FIGS. 1B to 1D as well as in FIGS. 1E to 1G and 2A to 2C. The locations of the horizontal sync modifications or wave forms in the program video picture are shown in FIGS. 3A or 3B and in FIGS. 3C or 3D.

In short, the first embodiment of the invention illustrated in FIG. 5 modifies the video signal such that the original horizontal sync and burst in video lines is replaced with a group of lines having pre-horizontal sync and burst signals, followed by a group of lines having post-horizontal sync and burst signals. In the second (alternative) embodiment of the invention, the apparatus shown in FIG. 5 inserts from time to time television lines located near the top and/or bottom of the field (which can include the vertical blanking interval) with both pre- and post-horizontal sync and color burst signals in each line. As part of the second embodiment, FIG. 5 also depicts circuitry for replacing or blanking out the original vertical sync signals, wherein the circuitry inserts fake vertical sync signals, that is, pre-vertical and post-vertical sync pulses, that alternate in different television lines. The alternating rate, for example, is between 9 Hz to 12 Hz.

Referring to FIG. 5, the program video is supplied via an input lead 61 into a video scrambler/processor 62. Block 62 does not modify the video into any of the embodiments of the present invention. Instead, the scrambler/processor 62 is a typical device that may invert the active video and/or position modulate the video line back and forth. It should be noted that the scrambler/processor 62 normally outputs standard sync and burst, although it may also generate a blanking edge toward the end of the video line following the edge fill period. See FIG. 2A, blanking edge 50. The output VID 1 of the scrambler/processor 62 is fed to a burst phase lock loop oscillator 64 which generates a continuous wave color subcarrier frequency signal. Oscillator 64 has a phase adjustment which matches its color burst phase to the phase of the video signal supplied to an amplifier 76 via a video input and a resistor R3. Circuit 62 also supplies its output VID 1 to a sync separator circuit 63. The sync separator circuit 63 in turn supplies signals including composite (comp) sync, vertical sync (V sync), horizontal sync (H sync) and a frame pulse, to a timing generator 66.

The timing generator 66 includes line counters, frame reset pulses, a programmed memory, multivibrator circuits, and combination logic which provide the following output signals:

a) a pre-horizontal sync signal (PRH) during the active TV field;

b) a post-horizontal sync signal (PSH) during the active TV field;

c) a pre-vertical sync signal (PRV);

d) a post-vertical sync signal (PSV);

e) a horizontal blanking interval signal (HBI);
f) a vertical blanking signal (V blank);
g) a vertical sync blanking signal with an HBI signal activated during the active TV field; and
h) a signal that is high during the top and/or bottom portions of the TV field (top/bottom location lines).

The clamped video signal VID 1 is supplied by the scrambler/processor 62 to a switch 65, which is used to blank to ground the horizontal blanking interval during the active field. The switch 65 also is used to blank out the vertical sync signals from the scrambler/processor 62. As a result, the output of the switch 65 is then video without sync and burst in the active field. The output of the switch also has no vertical sync pulses but contains horizontal rate sync with color burst in the vertical blanking interval. The HBI blanking/vertical sync blanking output of the timing generator 66 is used to control the switch 65, whose output is supplied to the amplifier 76 via an amplifier 75 and the resistor R3.

An H overlay rate generator 67 is used to switch the pre- and post-horizontal sync pulses back into selected lines throughout most of the active field. The output of the generator 67 is supplied to the D input of a latch circuit 69 which is clocked by an HBI pulse from the timing generator 66. When using the edge fill circuit for extended tearing, the latch circuit 69 is clocked by a horizontal rate pulse outside the HBI and edge fill areas. The output of the latch circuit 69 is allowed to change state during the beginning of the horizontal blanking interval. The latch circuit 69 is needed to prevent the generator 67 from changing state between the pre- and post-horizontal sync timings, to prevent the generator 67 from, at times, causing accidental double sync pulses to occur.

It is assumed that a jumper 72 is installed to a lead carrying the top/bottom location lines signal, whereby one input of an OR gate 71 is grounded. This means that the OR gate 71 is for now, acting as a buffer. The output of the latch circuit 69 then switches in complementary fashion to a multiplexer circuit. This multiplexer circuit is comprised of gate circuits 77, 78 and 79 respectively. An output of the gate 79 then contains either pre- or post-horizontal modified sync pulses. The distribution of these modified sync pulses is illustrated for example in FIG. 3A (also see FIGS. 1B and 1C). The output of the gate 79 is coupled through a resistor R8 to an inverting input of the amplifier 76 which generates negative (pre- and post-horizontal) sync pulses as an output signal.

In the invention modification where both pre- and post-horizontal sync pulses are used, the jumper 72 is not installed. With the jumper 72 open circuited, the timing generator 66 outputs a signal to a resistor R15 that is for example in a high state during the top and/or bottom lines of the video field. For example, the resistor R15 has a signal that is high during lines 22 to 52 and 232 to 262 of a field. In this instance, during the top and bottom group of lines, the post-horizontal sync pulses, for example, are always inserted. The pre-horizontal sync pulses also are added in the top and bottom groups of lines as controlled by the output signals of the latch circuit 69 in response to the H overlay rate generator 67. As a result, with the jumper 72 not installed, the top and bottom portions of the video field have from time to time both pre- and post-horizontal pulses. FIG. 3B illustrates this. FIG. 3B illustrates that the pre- horizontal sync as well as the post-horizontal sync as described above, can be inserted during the top and/or bottom portions of the program video picture.

The double sync modifications as described in the previous paragraph preferably are combined with the fake vertical sync pulses of previous mention for effective vertical scrambling. To insert or add the fake vertical sync pulses, the outputs of the timing generator 66 provide the pre-vertical sync pulse and post-vertical sync pulse. Both pre- and post-vertical sync pulses are high at least for one half of a TV line. Also these fake vertical pulses are high preferably outside the horizontal blanking interval. A vertical multiplexer circuit, comprising logic gate circuits 80, 81 and 82 respectively, alternately switches pre- or post-fake vertical sync pulses into the amplifier 76 by way of a resistor R5. The vertical multiplexer circuit is controlled by a latch circuit 70, which latches a vertical rate signal from a vertical rate generator 68 at the beginning of the vertical blanking interval (VBI).

An example of fake vertical sync signals is depicted by the application of pre-vertical sync pulses in lines 1 to 3. The post-vertical sync signal, for example, can be applied in lines 18 to 20. The generator 68 and the latch circuit 70 then provide an output signal which alternates between these two fake vertical sync pulses at a 10 to 12 Hz rate, for example, on a field-to-field basis.

To restore a color burst after each pre- and/or post-horizontal sync pulse, the output of the gate 79 is coupled to a one-shot timing circuit 83, whose output is a pulse of about 1.4 µs triggered by the trailing edge of the signal from gate 79. The output of one-shot 83 then controls a switch 73. The output of the switch 73 contains new burst envelopes of about 5 subcarrier cycles. These new burst envelopes are triggered by a pre- and/or post-horizontal sync pulse. The output of the switch 73 is supplied to an optional chroma band pass filter 74, whose output then restores a modified burst envelope to the lines after each pre- and/or post-horizontal sync by way of a resistor R7 and via the amplifier 76.

It should be noted that the pre-horizontal sync width need not be equal to the post-horizontal sync width. Also, the pre-vertical sync duration need not be the same duration as the post-vertical sync. Also the generators 67 and 68 in FIG. 5 may be periodic and/or random and/or pseudo random generators.

Figure 6A:
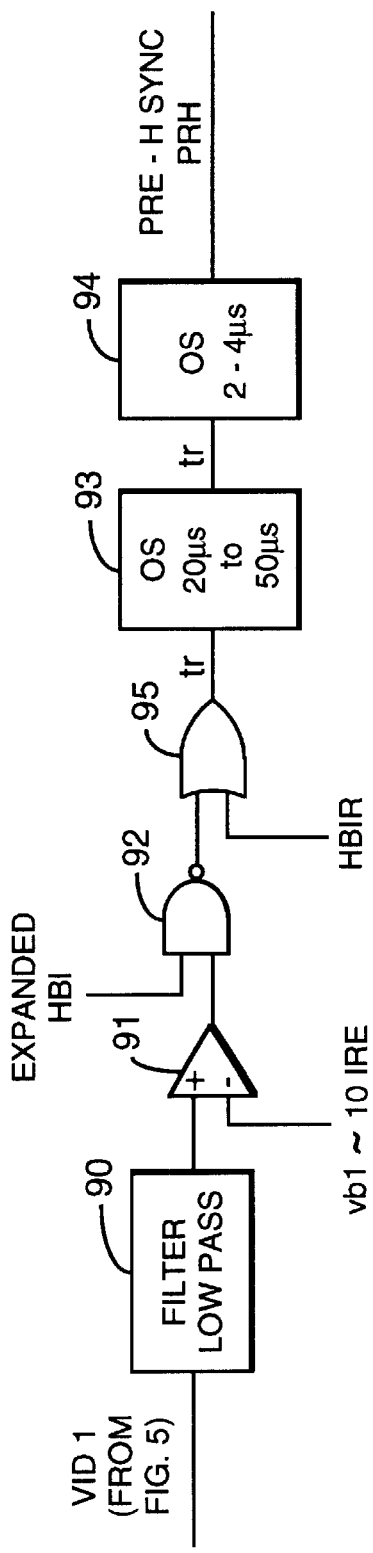
FIG. 6A is a block diagram of the present invention depicting circuitry for increasing the tearing effect by sensing the limits of the edge fill area thereby generating a more effective pre-horizontal sync pulse.
Figure 6B:
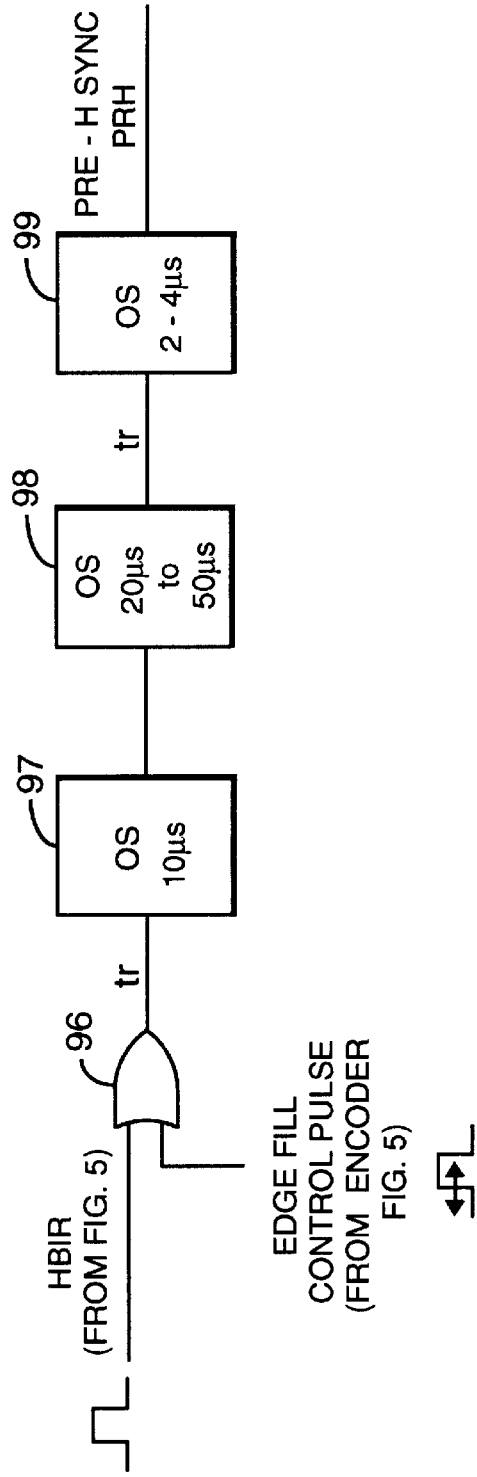
FIG. 6B is a block diagram of the present invention illustrating alternative circuitry for generating a more effective pre-horizontal sync pulse using an edge fill control signal available from a line-to-line scrambler such as the one described in U.S. Pat. No. 5,438,620, referenced below.

FIGS. 6A and 6B are block diagrams of alternative circuits of the present invention for increasing the amount of tearing or concealment by taking advantage of edge fill blanking. If the scrambler/processor 62 in FIG. 5 includes a video line shifting type of signal scrambling such as described in U.S. Pat. Nos. Re 35078, 5,438,620, 5,579,390, 5,581,307, 5,608,799 and U.S. Patent Applications, Ser. Nos. 08/400,831 and 08/401,015 (all incorporated by reference), the horizontal blanking interval (HBI) may be reduced for example from 11 microseconds to about 10 microseconds. The scrambling system described in the above noted patents and applications is colloquially known as PhaseKrypt. A reduced HBI (HBIR) would generally mean the gap between the pre- and post-horizontal sync pulses would also be reduced. This reduction then will cause a slightly less effective concealment. However, if the pre-horizontal sync pulse is allowed to start in the edge fill area outside the reduced 10 µs HBI, then the gap will be larger again. The edge fill area occurs for about 2 µs during the ending and the beginning of an active TV line. See FIG. 2A by way of example.

By way of summary:
a) If the scrambler/processor 62 does not have PhaseKrypt enabled, then the HBI would be about 11 µs. This would allow a gap of about 6 µs and the corresponding amount of tearing.
b) If PhaseKrypt is enabled, then the new HBI or HBIR would be about 10 µs. This would allow for a gap of about 5 µs and a corresponding amount of tearing.

c) If PhaseKrypt is enabled and the pre-horizontal sync is allowed to trigger off the (end of line) edge fill blanking edge, then the HBI will be somewhere between 10 μs and 12 μs. This will allow for a gap of 5 μs to 7 μs. See FIG. 2B, gap GEF. Thus, the tearing on the average will be expanded back to 6 μs. Of course, it is also possible to take advantage of the edge fill at the beginning of a video line to move the post-horizontal sync pulse further out. FIG. 2A, for simplicity, only shows the end of line edge fill.

FIG. 6A obtains the video signal VID 1 from the output of the scrambler/processor 62, FIG. 5, via a luminance filter 90. The output of filter 90 is supplied to a comparator 91, whose output is a logic high for luminance values above 10 IRE for example. A gate circuit 92 passes the output of the comparator 91 during the edge fill duration. The output of the circuit 92 is logically OR'D with a reduced duration HBI signal, HBIR, via a gate circuit 95. One-shots 93 and 94 form the pre-horizontal sync pulse. One-shot 93 is triggered during the edge fill period or the reduced HBI period HBIR. The output of the one-shot 94 then can be used to substitute the pre-horizontal sync signal of the timing generator 66 in FIG. 5.

FIG. 6B illustrates an alternative circuit for expanding the gap. Here, the reduced HBIR signal is logically OR'D with an edge fill control pulse from the scrambler/processor 62, FIG. 5, via a gate circuit 96. A one-shot 97 may be used to provide some noise immunity so that either the edge fill pulse or the HBIR pulse will trigger a pre-horizontal sync pulse. One-shots 98 and 99 form the "enhanced" gap pre-horizontal sync pulse. The output of one-shot 99 can then be used to substitute the pre-horizontal sync signal of the timing generator 66 in FIG. 5.

While the above description provides a full and complete disclosure of a preferred embodiment of the invention, various modifications, alternative constructions and equivalents will be apparent to those skilled ill the art. For example, the double horizontal sync pulses described in FIGS. 1D or 1E may be inserted independently (on the top and/or bottom of the video field) with a different generator source. In FIG. 5 the double sync pulses are related to the generator 67 that inserts the main pre- and post-horizontal sync pulses. Furthermore, the pulse widths, locations, color bursts, and frequencies (mentioned in this invention) can also be varied.

In addition, for example, if the tuners AGC circuits are modified (i.e. the AGC voltage time constant is increased) to accept varying horizontal pulse widths, then horizontal pulse width modulation may be used, In this case, the modulation frequency (and/or frequencies) of the first embodiment of the invention can be near some (combinations of the) multiple of the field frequency.

It is also possible to use some combination of pulse width and pulse position modulation. In short, other types of horizontal sync modulation can be applied within the scope of the invention.

In some cases, certain sync pulses may be deleted to cause the ceramic resonator oscillator in TV sets to unlock, thereby increasing the scrambling concealment.

The present invention is a scrambling system that can be used in conjunction with another scrambling system or can operate as a stand alone scrambling system. As a stand alone scrambling system, the present invention would modify the horizontal and/or vertical synchronizing signals of a standard video signal.

The present invention may comprise a modification of only the horizontal synchronizing pulses, only the vertical synchronizing pulses or a combination of the horizontal and vertical synchronizing pulses.

What is claimed is:
1. A method of enhancing the scrambling effect in a video signal formed of a field of video lines having normal horizontal and vertical sync signals in horizontal and vertical blanking intervals, comprising:
   replacing the normal horizontal sync signal with a pre-horizontal sync signal in first selected lines;
   replacing the normal horizontal sync signal with a post-horizontal sync signal in second selected lines; and
   position modulating the pre-horizontal and post-horizontal sync signals at a selected non-interleaved frequency which causes substantially irregular time intervals between the video lines, to provide correspondingly irregular time intervals between the video lines when subsequently scanned, to increase horizontal tearing which contributes to the enhanced scrambling effect.

2. The method of claim 1 including:
   inserting the pre-horizontal sync signal in a selected pre-H sync block of lines in the video field; and
   inserting the post-horizontal sync signals in a selected post-H sync block of lines following the pre-H sync block.

3. The method of claim 2 wherein the pre-H sync and post-H sync blocks of lines are successively alternated in about the middle 70 to 85% of the video field.

4. The method of claim 2 including:
   inserting a pre-vertical sync signal in a selected group of lines in the vertical blanking interval prior to the normal vertical sync signal; and
   inserting a post-vertical sync signal in a selected group of lines in the vertical blanking interval following a normal vertical sync signal.

5. The method of claim 4 wherein the pre-vertical sync signals are inserted in about lines 1 to 3, and the post-vertical sync signals are inserted in about lines 18 to 20, of the video field.

6. The method of claim 2 including:
   replacing the normal horizontal sync signal in the horizontal blanking intervals of a selected group of lines at the top and/or bottom of the video field with a double horizontal sync signal.

7. The method of claim 6 wherein the selected group of lines at the top and bottom of a NTSC video field generally are lines 22 to 52 and 232 to 262, respectively of the video field.

8. The method of claim 6 wherein the energy of the double horizontal sync signal in a video line is substantially the same as the energy of the horizontal sync signal of the other video lines.

9. The method of claim 1 for providing added horizontal tearing, wherein the non-interleaved frequency is equal to N * Field Frequency, where N is a positive whole number.

10. The method of claim 9 wherein selected portions of the video field are position modulated at different non-interleaved frequencies.

11. The method of claim 1 for providing an added vertical instability to the enhanced scrambling effect, wherein the non-interleaved frequency is equal to N * Field Frequency plus or minus K * 10% of field frequency, where N is a positive whole number and K is between 0 and 1 inclusive.

12. The method of claim 11 wherein the non-interleaved frequency in a NTSC color television standard includes frequencies of 474 to 486 Hz, 534 to 546 Hz, 594 to 606 Hz, 654 to 666 Hz, 714 to 726 Hz, 774 to 786 Hz.

13. The method of claim 1 wherein the pre-horizontal and post-horizontal sync signals have a narrowed width of about 2 through 4 microseconds.

14. The method of claim 13 wherein the time gap between the pre-horizontal and post-horizontal sync signals is about 5 to 7 microseconds.

15. The method of claim 1 wherein the horizontal blanking interval may be reduced in duration, including:
providing an edge fill area at the end of a video line outside the beginning of the horizontal blanking interval; and
inserting the pre-horizontal sync signal in the edge fill area.

16. The method of claim 1 wherein the horizontal blanking interval may be reduced in duration, including:
providing an edge fill area at the beginning of a video line outside the ending of the horizontal blanking interval; and
inserting the post-horizontal sync signal in the edge fill area.

17. A method of enhancing the scrambling effect in a video signal formed of a field of video lines having normal horizontal and vertical sync signals in horizontal and vertical blanking intervals, comprising:
replacing the normal horizontal sync signal in selected lines of the video field with a selected pre-horizontal sync signal and/or post-horizontal sync signal;
position modulating the pre-horizontal and/or post-horizontal sync signals at a selected non-interleaved frequency;
substantially removing the normal vertical sync signals;
inserting a pre-vertical sync signal in a selected group of lines prior to the normal vertical sync signal location; and
inserting a post-vertical sync signal in a selected group of lines following the normal vertical sync signal location.

18. The method of claim 17 wherein:
said pre-horizontal and post-horizontal sync signals are inserted in alternating blocks of lines in about the middle 70 to 85% of the video field; and
said pre-horizontal and post-horizontal sync signals are inserted in several lines prior to and following, respectively, the normal vertical sync signal location.

19. The method of claim 18 including:
replacing the normal horizontal sync signals in a selected group of lines at the top and/or bottom of the video field with a double horizontal sync signal.

20. The method of claim 19 wherein the selected group of lines at the top and bottom include about 10 to 30 lines at the top and bottom respectively of the video field.

21. The method of claim 19 wherein the width of the double horizontal sync is approximately similar to the width of the horizontal sync signals of the other video lines.

22. The method of claim 17 wherein the non-interleaved frequency is equal generally to N * Field Frequency, where N is a positive whole number.

23. The method of claim 17 wherein the non-interleaved frequency is equal to N * Field Frequency plus or minus K * 10% of field frequency, where N is a positive whole number and K is between 0 and 1 inclusive.

24. A method of enhancing the scrambling effect in a video signal formed of a field of video lines having normal horizontal and vertical sync signals in horizontal and vertical blanking intervals, comprising:
replacing the normal horizontal sync signal in selected lines in about the middle 70 to 85% of the active video field with a selected pre-horizontal and/or post-horizontal sync signal;
position modulating the pre-horizontal and/or post-horizontal sync signals at a selected non-interleaved frequency of about N * Field Frequency, where N is a positive whole number; and
replacing the normal horizontal sync signals in a selected group of lines at the top and/or bottom of the active video field with a double horizontal sync signal.

25. The method of claim 24 including:
replacing the normal vertical sync signal with a pre-vertical sync signal and a post-vertical sync signal in respective groups of lines prior to and following the normal vertical sync signal location.

26. Apparatus for enhancing the scrambling effect in a video signal formed of a field of video lines having normal horizontal and vertical sync signals in horizontal and vertical blanking intervals, comprising:
generating/logic means for supplying pre-horizontal and post-horizontal sync signals;
horizontal rate generator means for modulating the pre-horizontal and post-horizontal sync signals at a selected non-interleaved frequency which causes substantially irregular time intervals between the video lines, to provide correspondingly irregular time intervals between the video lines when subsequently scanned, thereby to increase horizontal tearing and the enhanced scrambling effect; and
switching/amplifier means responsive to the generating/logic means and the horizontal rate generator means, for replacing the normal horizontal sync signal in selected lines of the video field with a selected pre-horizontal and/or post-horizontal sync signal.

27. The apparatus of claim 26 wherein:
said generating/logic means further supplies pre-vertical and post-vertical sync signals;
the apparatus including vertical rate generator means for modulating the pre-vertical and post-vertical sync signals at a selected vertical rate frequency; and
said switching/amplifier means being further responsive to the vertical rate generator means for inserting a pre-vertical sync signal and/or post-vertical sync signal in respective groups of lines prior to and following the normal vertical sync signal.

28. The apparatus of claim 27 wherein the generating/logic means includes:
sync separator means for providing normal vertical sync and horizontal sync signals;
timing generating means responsive to the sync separator means for supplying the pre-horizontal, post-horizontal, pre-vertical and post-vertical sync signals; and
a logic circuit for supplying selected pre and/or post sync signals to the switching amplifier means in response to the horizontal rate and vertical rate generator means.

29. The apparatus of claim 28 wherein:
the logic circuit supplies the pre-horizontal and post-horizontal sync signals into alternate blocks of lines in about the middle 70 to 85% of the video field at the on-interleaved frequency as provided by the horizontal rate generator means.

30. The apparatus of claim 29 wherein the non-interleaved frequency is equal to N * Field Frequency, where N is a positive whole number.

31. The apparatus of claim 29 wherein the non-interleaved frequency is equal to N * Field Frequency plus or minus K * 10% of field frequency, where N is a positive whole number and K is between 0 and 1 inclusive.

32. The apparatus of claim 28 wherein:

the logic circuit supplies the pre-horizontal and post-horizontal sync signals into a selected group of lines at the top and/or bottom of the video field in response to the horizontal rate generator means to define a double horizontal sync signal in each video line of the groups.

33. The apparatus of claim 28 wherein the switching/amplifier means includes:

switch means receiving the video signal and responsive to the timing generator means, for providing a video signal without selected sync and color burst signals in the active video field; and an amplifier responsive to the switch means for adding the selected pre-horizontal and post-horizontal and/or pre-vertical and post-vertical, sync signals into the selected lines or groups of lines, respectively.

34. The apparatus of claim 33 wherein:

the logic circuit supplies, in place of the normal vertical sync signal, the pre-vertical and post-vertical sync signals in respective groups of lines prior to and following the normal vertical sync signal, in response to the vertical rate generator means.

35. The apparatus of claim 28 wherein the pre-horizontal and post-horizontal sync signals have a narrowed width of about 2 through 4 microseconds.

36. The apparatus of claim 28 wherein the horizontal blanking interval may be reduced in duration, including:

circuit means for inserting the pre-horizontal sync signal in an edge fill area of a video line outside the beginning of the associated horizontal blanking interval, to thereby increase the time gap between the position modulated pre-horizontal and post-horizontal sync signals.

37. The apparatus of claim 28 wherein the horizontal blanking interval may be reduced in duration, including:

circuit means for inserting the post-horizontal sync signal in an edge fill area of a video line outside the ending of the associated horizontal blanking interval, to thereby increase the time gap between the position modulated pre-horizontal and post-horizontal sync signals.

* * * * *